United States Patent
Hunt et al.

(10) Patent No.: US 12,287,011 B1
(45) Date of Patent: Apr. 29, 2025

(54) FRICTION WASHER FOR LIMITED SLIP DIFFERENTIAL CLUTCH PACK

(71) Applicant: Schaeffler Technologies AG & Co. KG, Herzogenaurach (DE)

(72) Inventors: Kenneth Hunt, Orrville, OH (US); Matthew Fowler, Canton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/734,358

(22) Filed: Jun. 5, 2024

(51) Int. Cl.
F16D 13/52 (2006.01)
F16D 13/64 (2006.01)
F16H 48/38 (2012.01)
F16H 48/22 (2006.01)

(52) U.S. Cl.
CPC .......... F16D 13/648 (2013.01); F16H 48/38 (2013.01); F16D 2300/10 (2013.01); F16H 48/22 (2013.01); F16H 2048/387 (2013.01)

(58) Field of Classification Search
CPC .................................................. F16D 13/648
See application file for complete search history.

(56) References Cited

U.S. PATENT DOCUMENTS

| | | | | |
|---|---|---|---|---|
| 6,105,234 A * | 8/2000 | Kremsmair | ......... | F16D 69/0408 188/218 XL |
| 6,318,534 B1 * | 11/2001 | Zimprich | .............. | F16D 25/123 192/70.14 |
| 9,382,990 B2 | 7/2016 | Nolte et al. | | |
| 2007/0108009 A1 * | 5/2007 | Ando | ....................... | F16D 13/64 192/84.91 |
| 2009/0050434 A1 * | 2/2009 | Okamura | ................. | F16D 13/72 192/113.36 |
| 2016/0053823 A1 * | 2/2016 | Nickel | .................. | F16D 65/122 192/107 M |
| 2017/0276191 A1 * | 9/2017 | Farahati | ............... | B23K 26/355 |
| 2018/0216673 A1 * | 8/2018 | Götz | ....................... | F16D 13/74 |
| 2022/0112930 A1 * | 4/2022 | Muehlegger | .......... | F16D 69/027 |
| 2023/0392652 A1 * | 12/2023 | Ma | .......................... | F16D 13/74 |

OTHER PUBLICATIONS

Wei et al., "An Experimental Study of Micro-Dimpled Texture in Friction Control under Dry and Lubricated Conditions", Micromachines 2022, 10 pages.

* cited by examiner

*Primary Examiner* — Stacey A Fluhart
(74) *Attorney, Agent, or Firm* — Volpe Koenig

(57) ABSTRACT

A friction washer for a limited slip differential is provided, with the friction washer including a disk body having first and second opposing surfaces. The first and second opposing surfaces define respective first and second contact planes and include recesses that extend into the disk body from the respective first and second contact planes such that only a portion of the disk body extends to the respective first and second contact plane. The recesses are defined by partial spherical or partial cylindrical surfaces. This provides improved properties for holding lubricating fluid circulated within the differential so that the hydrodynamic pressure created between the friction surfaces provides a more consistent film or boundary layer of the lubricating fluid for a more uniform coefficient of friction over various operating speeds and pressures.

9 Claims, 6 Drawing Sheets

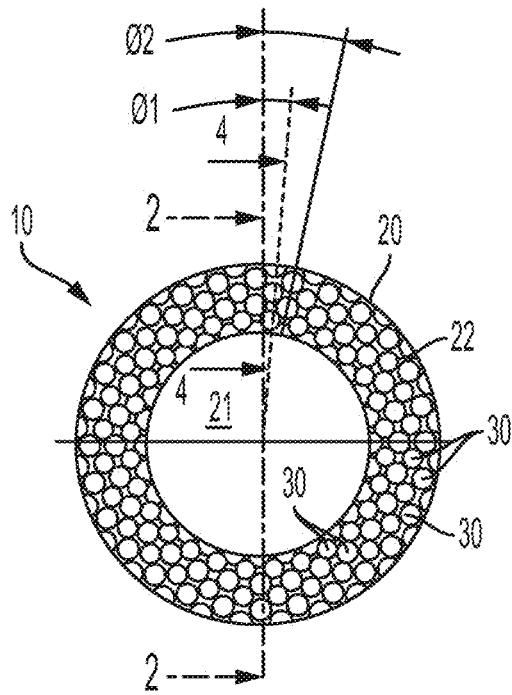
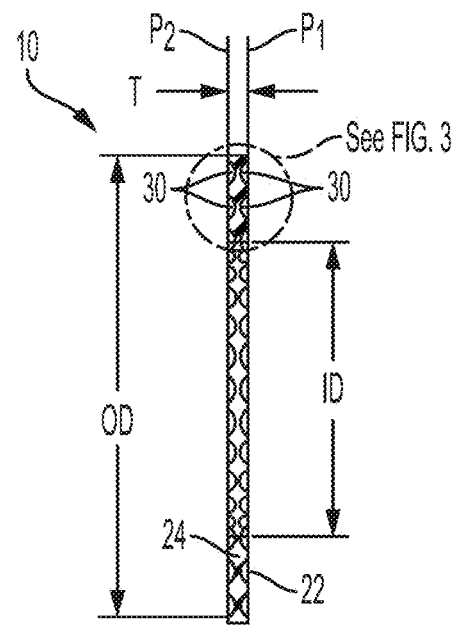
FIG. 1
FIG. 2
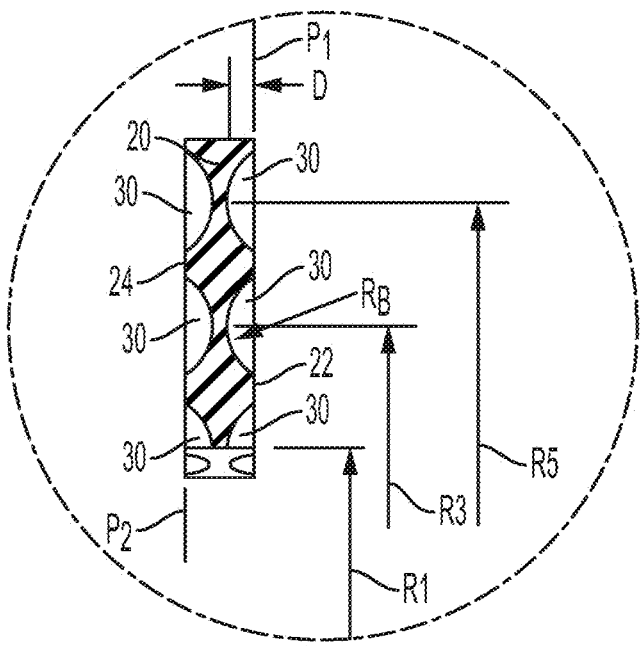
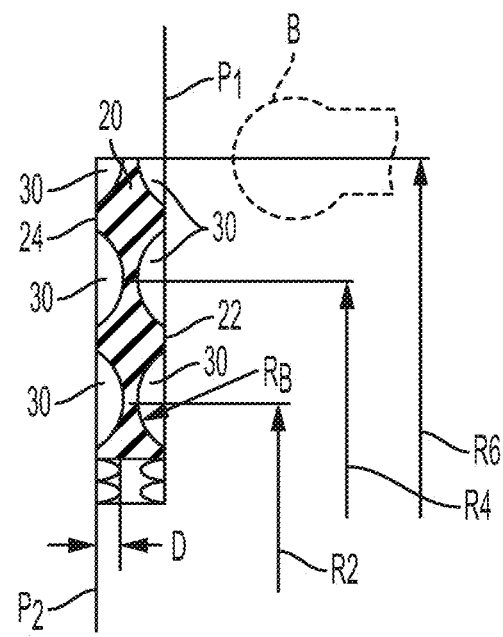
FIG. 3
FIG. 4

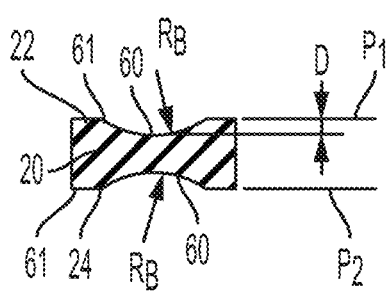
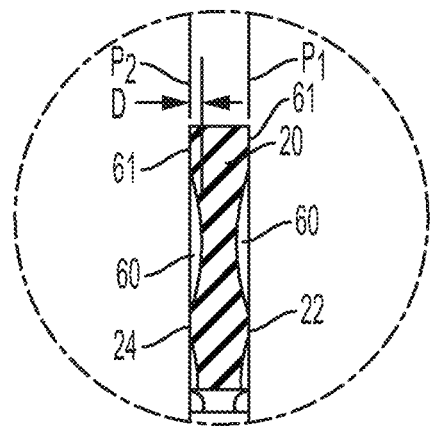
FIG. 19　　　　FIG. 20
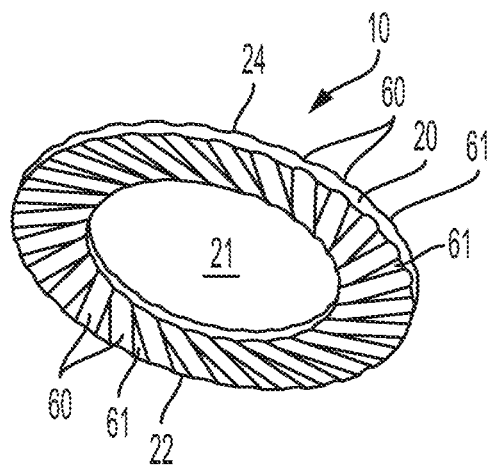
FIG. 21

FRICTION WASHER FOR LIMITED SLIP DIFFERENTIAL CLUTCH PACK

TECHNICAL FIELD

The disclosure relates to mechanical limited slip differentials, and more particularly to the friction washers used in mechanical limited slip differentials.

BACKGROUND

In existing mechanical limited slip differentials (mLSDs), friction surfaces of the case ends of the casing, which may be formed as caps having friction surfaces, are used to transfer torque to the end surfaces of helical differential output gears that are connected to the axles. In the case of one wheel/axle turning freely with limited torsional resistance and the other wheel/axle not turning, the helical pinion gears between the two helical output gears apply axial pressure to the helical output gear of the non-turning wheel/axle pressing it against the friction surface/cap on the casing to transfer torque to the non-turning wheel/axle.

Bevel gear limited slip differentials also use friction surfaces in clutch packs arranged in the torque path between the casing and the axles, where the clutch packs are axially compressed by axial movement of the output bevel gear of the non-turning axle/wheel to transfer torque from the casing to the non-turning wheel/axle.

In each case, one or more of the friction surfaces may be provided on a friction washer which can be in the torque path, and may be for example, connected to an axial end face of an output gear.

In order to create a desired torque bias ratio (TBR), the amount of friction created between the mating friction surfaces is critical. Generating a uniform friction characteristic at various operating speeds and pressures also provides for smoother operation. While flat surfaces and various patterned friction surfaces and coatings are known, these fail to provide a relatively constant coefficient of friction over a range of speeds and pressures between the friction partners It would be desirable to provide an arrangement that creates an ideal friction characteristic.

SUMMARY

In one aspect, a friction washer for a limited slip differential is provided, with the friction washer including a disk body having first and second opposing surfaces. The first opposing surface defines a first contact plane and includes recesses that extend into the disk body from the first contact plane such that only a portion of the disk body extends to the first contact plane. The second opposing surface defines a second contact plane and includes recesses that extend into the disk body from the second contact plane such that only a portion of the disk body extends to the second contact plane. The recesses that extend into the disk body from the first contact plane and from the second contact plane are defined by partial spherical or partial cylindrical surfaces. Based on testing, the partial spherical or partial cylindrical surfaces provide better properties for holding lubricating fluid circulated within the differential so that the hydrodynamic pressure created by this type of recesses provides a more consistent film or boundary layer of the lubricating fluid between the first opposing surface and a mating friction partner, which can be a smooth surface, which allows the lubricating fluid to act to push the surfaces apart.

In one embodiment, the portion of the disk body that extends to the first contact plane is from about 10% to 40% of a surface area of the first opposing surface, and more specifically may be between 20% and 35%. Further, the portion of the disk body that extends to the second contact plane is from about 10% to 40% of a surface area of the second opposing surface, and more specifically may be between 20% and 35%.

In one embodiment, the recesses that extend into the disk body from the first contact plane and from the second contact plane are defined as a plurality of non-intersecting part-spherical dimples that each define a circle at respective intersections with the first contact plane and the second contact plane. With this arrangement, a flow of lubricating fluid from the inner periphery of the disk body to the outer periphery is more limited than in other embodiments as no radial paths of the recesses are provided between the inner and outer peripheries.

In one embodiment, the recesses that extend into the disk body from the first contact plane and from the second contact plane are defined as a plurality of part-spherical recesses, and at least some of the part-spherical recesses on the first opposing surface intersect one another at least some of the part-spherical recesses on the second opposing surface intersect one another. Here, the disk body may include an opening defining an inner periphery in the disk body, and the disk body further includes an outer periphery. Some of the part-spherical recesses that intersect one another on the first opposing surface are arranged as a plurality of groups, with each of the groups including a sub-set of the part-spherical recesses that intersect at least one of the other ones of the part-spherical recesses in the group to form a caterpillar-shaped recess pathway on the first opposing surface that extends from the inner periphery to the outer periphery in which each of the part-spherical recesses in the group, other than the part-spherical recesses that intersect the inner periphery and the outer periphery, intersects the first contact plane at two spaced apart locations. These intersections are in the form of partial segments of a circle.

Further, the part-spherical recesses that intersect one another on the second opposing surface are arranged as a plurality of groups, with each of the groups including a sub-set of the part-spherical recesses that intersect at least one of the other ones of the part-spherical recesses in the group to form a caterpillar-shaped recess pathway on the second opposing surface that extends from the inner periphery to the outer periphery in which each of the part-spherical recesses in the group, other than the part-spherical recesses that intersect the inner periphery and the outer periphery, intersects the second contact plane at two spaced apart locations. These intersections are also in the form of partial segments of a circle.

In one refinement of this embodiment, the part-spherical recesses in each of the groups, other than the part-spherical recesses that intersect the inner periphery, do not intersect the part-spherical recesses of other ones of the subsets. This provides a plurality of distinct radially extending flow paths for the lubricating fluid from the inner periphery to the outer periphery. Here, the caterpillar-shaped recess pathways on the first opposing surface and on the second opposing surface each provide a lubricating fluid path from the inner periphery to the outer periphery that include internal ridges between the intersecting part-spherical recesses in each said group.

In another refinement, the caterpillar-shaped recess pathways may each extend at an angle offset from a true radial direction. This can be a constant angle, or each of the part-spherical recesses in one of the groups can be offset in a circumferential direction from an adjacent intersecting radially inwardly located one of the part-spherical recesses in the group. In one arrangement, the plurality of these caterpillar-shaped recess pathways are each arranged in a part-helical manner.

In another aspect, the recesses that extend into the disk body from the first contact plane and from the second contact plane of the friction washer may be defined as a plurality of part-cylindrical recesses, and at least some of the part-cylindrical recesses intersect one another.

In one refinement, the disk body can include an opening defining an inner periphery in the disk body, and the disk body further includes an outer periphery. The part-cylindrical recesses on the first opposing surface intersect one another to define a grid of contact faces that make up the portion of the disk body that extends to the first contact plane. Further, the part-cylindrical recesses on the second opposing surface that intersect one another define a grid of contact faces that make-up the portion of the disk body that extends to the second contact plane. In one refinement, the contact faces are square and arranged in a regularly spaced grid.

In another refinement, the disk body can include an opening defining an inner periphery in the disk body, and the disk body further includes an outer periphery, and the part-cylindrical recesses on the first opposing surface extend linearly from the inner periphery to the outer periphery and the part-cylindrical recesses on the second opposing surface extend linearly from the inner periphery to the outer periphery. In one arrangement, the linearly extending part-cylindrical recesses may extend at an angle from a radial direction from the inner periphery to the outer periphery.

In all of the embodiments, the recesses have a maximum depth of 1.2 mm or less, and more particularly less than 0.9 mm, and the partial spherical or partial cylindrical recesses have a radius of 2.5 mm to 5 mm.

In another aspect, a method of forming a friction washer for a limited slip differential is provided, with the method including the steps of a) providing a disk body having first and second opposing surfaces; and b) forming recesses into respective first and second contact planes of the first and second opposing surfaces such that only a portion of the disk body extends to the respective first and second contact plane, wherein the recesses are defined by partial spherical or partial cylindrical surfaces that can be machined using a ball end mill. In a preferred embodiment, the partial spherical or partial cylindrical recesses have a radius of 2.5 mm to 5 mm and a maximum depth of 1.2 mm or less, and more particularly less than 0.9 mm The method may further include forming the recesses as a plurality of non-intersecting, part-spherical dimples that each define a circle at a respective intersection with the contact plane. Alternatively, the method may further include forming the recesses as a plurality of part-spherical recesses, with at least some of the part-spherical recesses intersecting one another. The method can also include forming the recesses as a plurality of part-cylindrical recesses.

In a preferred arrangement, the disk body is steel, and the method may further include nitrocarburizing the first opposing surface, or using other known surface treatments or coatings.

One or more of the above features can be combined to provide a gear assembly that utilizes the friction washer with improved performance.

BRIEF DESCRIPTION OF THE DRAWING(S)

The foregoing Summary as well as the following Detailed Description will be best understood when read in conjunction with the appended drawings, which illustrate an embodiment according to the disclosure. In the drawings:

FIG. 1 is a plan view of a first surface of the first embodiment of a friction washer in accordance with the present disclosure, with the opposing second surface being identical thereto.

FIG. 2 is a cross-sectional view of the friction washer of FIG. 1 taken along line 2-2 in FIG. 1.

FIG. 3 is an enlarged detail of a portion of the cross-sectional view taken from FIG. 2 showing the non-intersecting part-spherical recesses in the form of dimples on the first surface of the friction washer shown in FIG. 1.

FIG. 4 is an enlarged detail of a portion of the cross-sectional view taken along line 4-4 in FIG. 1 showing the offset non-intersecting part-spherical recesses in a staggered arrangement in the circumferential direction from the recesses shown in FIG. 3, as can be seen from FIG. 1.

FIG. 19 is an enlarged partial cross-sectional view taken along line 19-19 in FIG. 17.

FIG. 20 is an enlarged detail of a portion of the cross-sectional view taken from FIG. 18 showing the arrangement of the part-cylindrical recesses.

FIG. 21 is a perspective view of the first side of the fourth embodiment of the friction washer shown in FIGS. 17-20.

DETAILED DESCRIPTION

Figure 5:
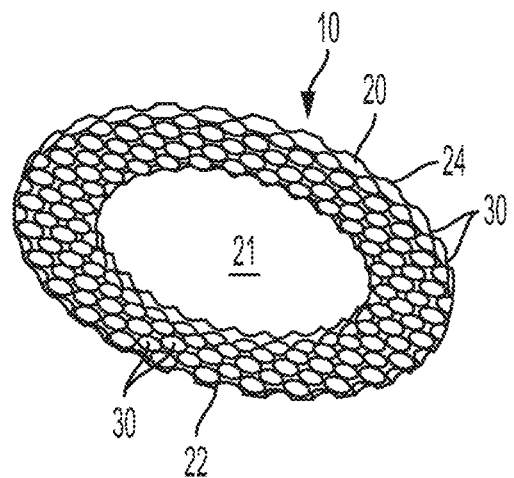
FIG. 5 is a perspective view showing the first surface of the friction washer shown in FIGS. 1-4, with the opposing second surface preferably being identical thereto.

Certain terminology is used in the following description for convenience only and is not limiting. "Axial" refers to a direction along an axis. A reference to a list of items that are cited as "at least one of a, b, or c" (where a, b, and c represent the items being listed) means any single one of the items a, b, or c, or combinations thereof. The terms "generally", "about" and "approximately" are to be construed as within 10% of a stated value or ratio. The terminology includes the words specifically noted above, derivatives thereof, and words of similar import.

FIGS. 1-21 show four different embodiments of a friction washer 10 for a limited slip differential that provide a generally constant friction with changing speeds and pressures based on the configuration of the friction surface which forms part of a friction pair for transferring torque from the driveline to a non-spinning axle/wheel when functioning to limit slip.

In the first embodiment of the friction washer 10 shown in FIGS. 1-5, the friction washer 10 includes a disk body 20, preferably made of steel, having first and second opposing surfaces 22, 24. The first opposing surface 22 defines a first contact plane P1 and includes recesses 30 that extend into the disk body 20 from the first contact plane P1 such that only a portion of the disk body extends to the first contact plane P1. Preferably, the portion of the disk body 20 that extends to the first contact plane P1 is from about 10% to 40% of a surface area of the first opposing surface 22, and more preferably is in the range of 20-35%.

In the first embodiment of the friction washer 10, the second opposing surface 24 is shown as defining a second contact plane P2 and including recesses 30 that extend into the disk body from the second contact plane P2 such that only a portion of the disk body extends to the second contact plane P2. Preferably, the portion of the disk body 20 that extends to the second contact plane P2 is from about 10% to 40% of a surface area of the second opposing surface 24, and more preferably is in the range of 20-35%.

In the first preferred embodiment, the recesses 30 are defined by partial spherical surfaces formed as non-intersecting, part-spherical dimples that each define a circle at respective intersections with the first contact plane P1 and the second contact plane P2. Here, non-intersecting means that 95% or more of the circle-shaped periphery at the respective contact planes P1, P2 is complete and does not intersect a neighboring recess 30. This is shown in FIG. 1. In this case, the disk body 20 preferably includes an opening 21 that defines an inner periphery inside diameter ID in the disk body 20. The disk body 20 also includes an outer periphery outside diameter OD in the illustrated embodiment, the ID and OD are circular. However, non-circular forms could also be utilized.

The part-spherical recesses 30 are arranged in offset circumferentially extending rows on each of the opposing surfaces 22, 24. In the illustrated embodiment, there are four rows of the part-spherical dimple-shaped recesses 30, where each recess 30 defines a circle at the intersection with the respective contact plane P1, P2 and the recesses 30 are non-intersecting. The inner-most and outer-most circumferentially extending rows of these part-spherical recesses 30 which intersect the ID and OD generally form half-circular intersections with the respective contact plane P1, P2. As can be seen from FIGS. 1, 3, and 4, preferably the non-intersecting, part-spherical recesses 30 are arranged centered on radially extending lines defined at angles θ1 and θ2, indicated in FIG. 1 and shown in cross-section FIGS. 3 and 4, which are offset a sufficient amount to ensure that the recesses 30 do not intersect. In the illustrated embodiment, the non-intersecting part-spherical-shaped recesses 30 are formed with the radius RB of approximately 2.5 mm and θ1 is approximately 6.429° while θ2 is approximately 12.857°. In the illustrated embodiment, there are 28 offset sets of these recesses 30 (i.e., on the radially extending lines shown at angles θ1 and θ2) arranged around the friction washer 10 on each of the opposing sides 22, 24. However, the specific number, arrangement and size of the non-intersecting part-spherical recesses 30 can be varied. Further, the arrangement may be different on each of the opposing sides 22, 24, or one of the opposing sides 22, 24 could be smooth.

In the illustrated embodiment, the friction washer 10 is approximately 70 mm in OD and the ID is approximately 44 mm. However, other sizes of the friction washer 10 could be utilized. In the illustrated embodiment, the thickness T of the friction washer 10 is approximately 2.5 mm to 2.9 mm, but could vary depending on the application, and the maximum depth D of the recesses 30 is approximately 1.1 mm. The radius of the recesses RB is preferably less than 5 mm, and is more preferably about 2.5 mm. The circumferentially extending rows of the recesses 30 are arranged on six different radii R1-R6, indicated in FIGS. 4 and 5 which are spaced apart from one another. Here, R1 is equal to the ID and R6 is equal to the OD while R2, R3, R4, and R5 are equally spaced from one another in the radial direction.

This arrangement does not provide any direct radial flow passage for the lubricating fluid used in the limited slip differential. The hydrodynamic pressure created by lubricating fluid in these non-intersecting part-spherical recesses 30, based in part on the surface tension of the lubricating fluid at the circular intersections of the recesses 30 at the respective contact plane P1, P2, creates a boundary layer of the lubricating fluid that allows the facing rotating component and the friction washer 10 to be pushed apart while maintaining the boundary layer of lubricating fluid. This arrangement of the recesses 30 provides for a generally constant coefficient of friction with changing speed and pressure.

Referring now to FIGS. 6-11, a second embodiment of the friction washer 10 is shown. The second embodiment of the friction washer 10 is the same as the first embodiment except for the arrangement of the recesses 40. Here the recesses 40 are defined in the first opposing surface 22 and in the second opposing surface 24 in an arrangement in which the part-spherical recesses 40 intersect one another.

Figure 8:
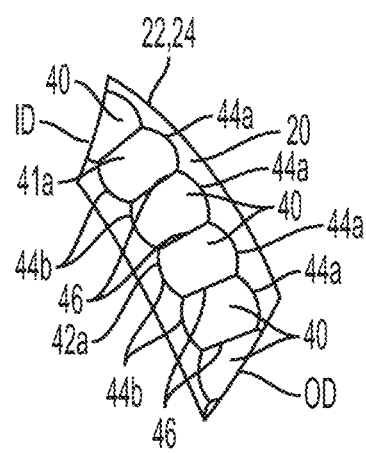
FIG. 8 is an enlarged detail view showing one group of the part-spherical recesses that intersect one another to form a caterpillar-shaped recess pathway.
Figure 10:
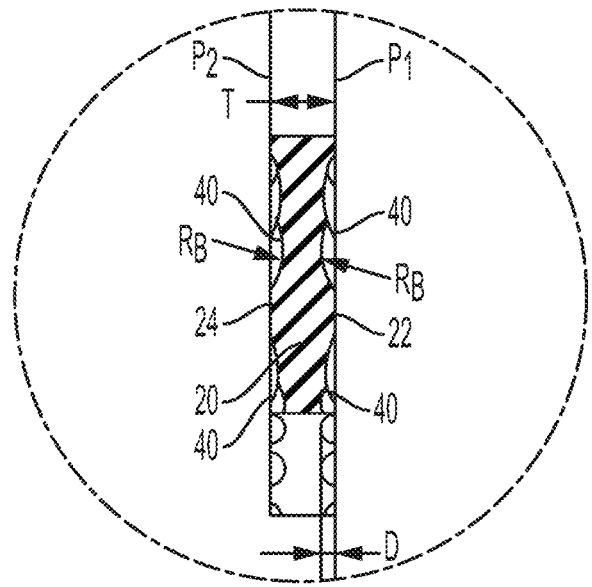
FIG. 10 is an enlarged detail of a portion of the cross-sectional view taken from FIG. 7 showing the arrangement of the part-spherical recesses used in connection with the second embodiment of the friction washer.
Figure 9:
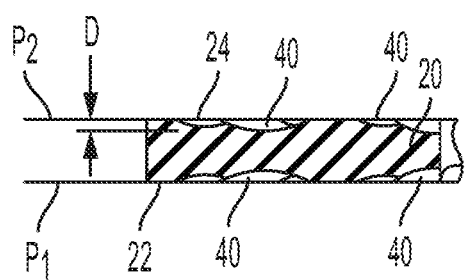
FIG. 9 is a cross-sectional view taken along lines 9-9 in FIG. 6.
Figure 11:
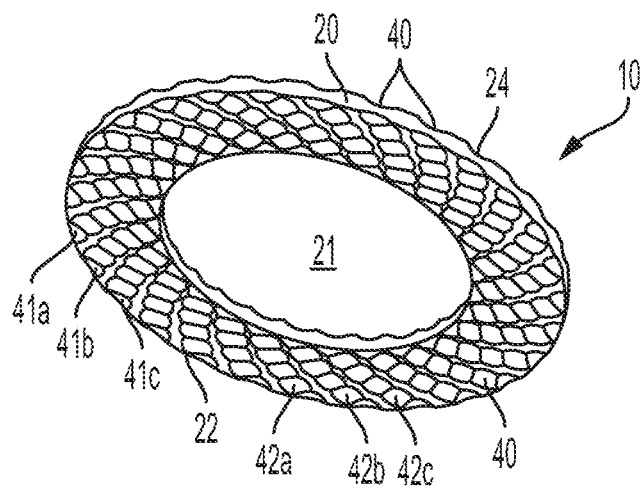
FIG. 11 is a perspective view showing the first surface of the second embodiment of the friction washer shown in FIGS. 6-10.

As shown in FIG. 8, the disk body 20 includes the opening 21 that defines the inner periphery ID in the disk body 20 as well as includes an outer periphery OD. In the preferred embodiment, the ID and OD are circular. However, non-circular shapes could be utilized.

Figure 6:
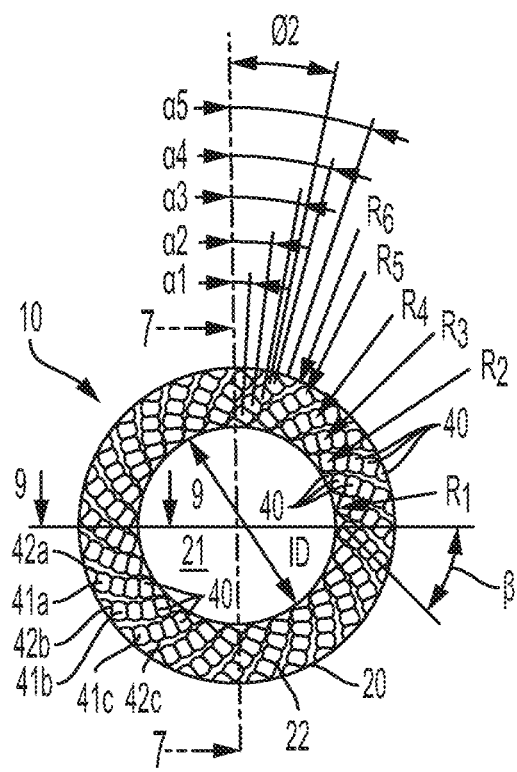
FIG. 6 is a plan view of a first surface of a second embodiment of a friction washer in accordance with the present disclosure, with the opposing second surface being identical thereto.
Figure 7:
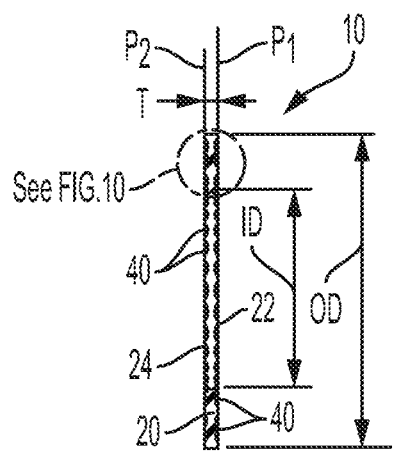
FIG. 7 is a cross-sectional view through the second embodiment of the friction washer shown in FIG. 6 taken along line 7-7 in FIG. 6.

As shown in detail in FIGS. 6 and 8, the part-spherical recesses 40 that intersect one another on each of the first opposing surface 22 and the second opposing surface 24 are arranged as a plurality of groups 41a, 41b, 41c, etc., and each of these groups 41a, 41b, 41c, etc., includes a sub-set of the part-spherical recesses 40 that intersect at least one of the other ones of the part-spherical recesses 40 in the group 41a, 41b, 41c, etc. to form caterpillar-shaped recess pathways 42a, 42b, 42c, etc., that extend from the inner periphery ID to the outer periphery OD on the first opposing surface 22. Here, each of the part-spherical recesses 40 in the group 41a, 41b, 41c, other than those part-spherical recesses 40 that intersect the inner periphery ID and the outer periphery OD intersects the first contact plane P1 at two spaced apart locations 44a, 44b, indicated in FIG. 8, in the form of 2 spaced-apart circle segments. As can be seen in FIGS. 6 and 8, the part-spherical recesses 40 in each of the groups 41a, 41b, 41c, etc, other than the part-spherical recesses that intersect the inner periphery ID, do not intersect the part-spherical recesses 40 of other ones of the groups 41a, 41b, 41c, etc. Based on this, the caterpillar-shaped recess pathways 42a, 42b, 42c, etc. that are formed each provide a separate lubricating flow path from the inner periphery ID to the outer periphery OD on the first opposing surface 22. These independent flow paths include internal ridges 46 between the intersecting part-spherical recesses 40 in each group 41a, 41b, 41c, etc. Based on the height and spacing of these ridges, a volume of the lubricating fluid flow can be tailored for particular applications.

Similarly, each of the part-spherical recesses 40 in the group 41a, 41b, 41c, other than those part-spherical recesses 40 that intersect the inner periphery ID and the outer periphery OD intersects the second contact plane P1 at two spaced apart locations 44a, 44b, indicated in FIG. 8, in the form of 2 spaced-apart circle segments. Based on this, the caterpillar-shaped recess pathways 42a, 42b, 42c, etc. that are formed each provide a separate lubricating flow path from the inner periphery ID to the outer periphery OD on the second opposing surface 24. These independent flow paths include internal ridges 46 between the intersecting part-spherical recesses 40 in each group 41a, 41b, 41c, etc. Based on the height and spacing of these ridges, a volume of the lubricating fluid flow can be tailored for particular applications.

As shown in FIG. 6, preferably the caterpillar-shaped recess pathways 42a, 42b, 42c, etc., each extend at an angle β that is offset from a true radial direction. Here, B is between about 30° and 60°, more particularly, is about 45°.

As shown in FIG. 6, there are preferably 28 of the caterpillar-shaped recess pathways 42a, 42b, 42c, etc., on each of the opposing surfaces 22, 24 which are equally spaced apart, with θ2 approximately equal to 12.857°. However, the number of the pathways 42a, 42b, 42c, etc. could vary. Further, the arrangement may be different on each of the opposing sides 22, 24, or one of the opposing sides 22, 24 could be smooth.

In order to provide a particular profile that has a generally constant coefficient of friction with changing speed and pressure, it is possible for each of the part-spherical recesses 40 in one of the groups 41a, 41b, 41c, etc., to be offset in a circumferential direction from an adjacent intersecting radially inwardly located one of the part-spherical recesses 40 by a different angular spacing in the circumferential direction to provide a part-helical shaped pathway. These angles are illustrated as α1-α5 in FIG. 6. In one preferred arrangement, α1 is approximately 3.8°, α2 is approximately 7.6°, α3 is approximately 11.4°, α4 is approximately 15.2°, and α5 is approximately 19°. Different angular spacing can be used in order to provide different part-helical-shaped profiles.

In the second embodiment of the friction washer 10, the OD can be approximately 70 mm and the ID can be approximately 44 mm. Here, 28 subsets 41a, 41b, 41c, etc., can be provided forming 28 caterpillar-shaped recess pathways 42a, 42b, 42c, etc. on each of the opposing surfaces 22, 24. Here, the radius RB of the part-spherical recesses is preferably less than 5 mm, and more preferably approximately 4 mm, and the recesses have a maximum depth D of approximately 0.7 mm. However, other sizes could be used depending upon the particular application. The thickness T of the friction washer 10 is approximately 2.5 mm to 2.9 mm, but could vary depending on the application.

Preferably, in this embodiment, the portion of the disk body 20 that extends to the first contact plane P1 is from about 10% to 40% of a surface area of the first opposing surface 22, and more preferably is in the range of 20-35%. Further, the portion of the disk body 20 that extends to the second contact plane P2 is from about 10% to 40% of a surface area of the second opposing surface 24, and more preferably is in the range of 20-35%.

This arrangement does provides generally radially extending flow passages formed by the caterpillar-shaped recess pathways 42a, 42b, 42c, etc. for the lubricating fluid used in the limited slip differential. The hydrodynamic pressure created by lubricating fluid in these part-spherical recesses 40, based in part on the surface tension of the lubricating fluid at the part-circular segment intersections of the recesses 40 at the first and/or second contact plane P1, P2, creates a boundary layer of the lubricating fluid that allows the facing rotating component and the friction washer 10 to be pushed apart while maintaining the boundary layer of lubricating fluid. With the intersecting arrangement of the recesses 40, this hydrodynamic pressure is lower than for the arrangement of non-intersecting part-spherical recesses 30 in the first embodiment. This arrangement of the recesses 40 also provides for a generally constant coefficient of friction with changing speed and pressure.

Figure 12:
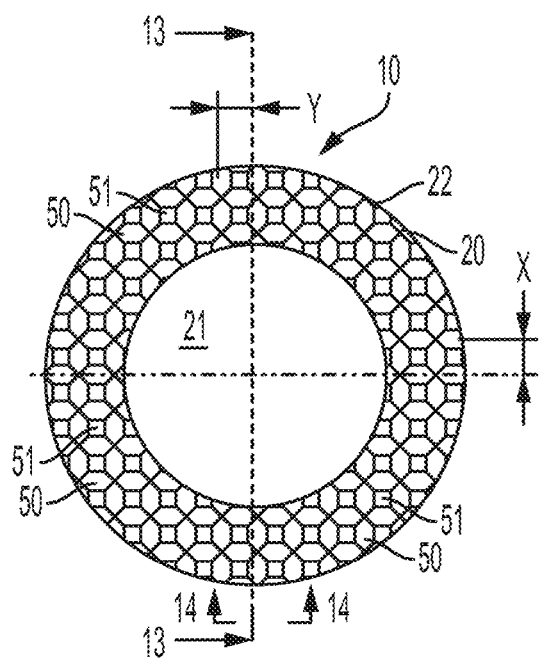
FIG. 12 is a plan view showing a first surface of a third embodiment of a friction washer in accordance with the present disclosure, with the opposing second surface being identical thereto.
Figure 13:
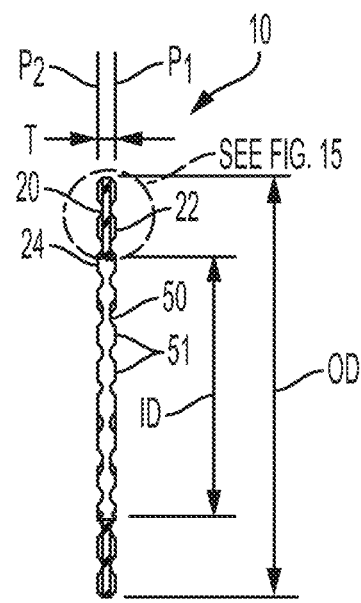
FIG. 13 is a cross-sectional view taken along lines 13-13 in FIG. 12.
Figure 14:
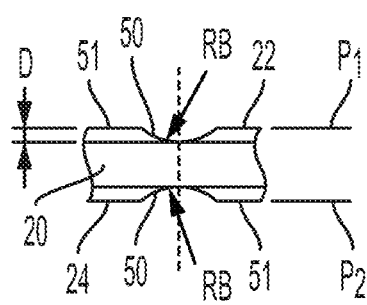
FIG. 14 is a side elevational view taken along lines 14-14 in FIG. 12 showing the radius of the part-cylindrical recesses.
Figure 15:
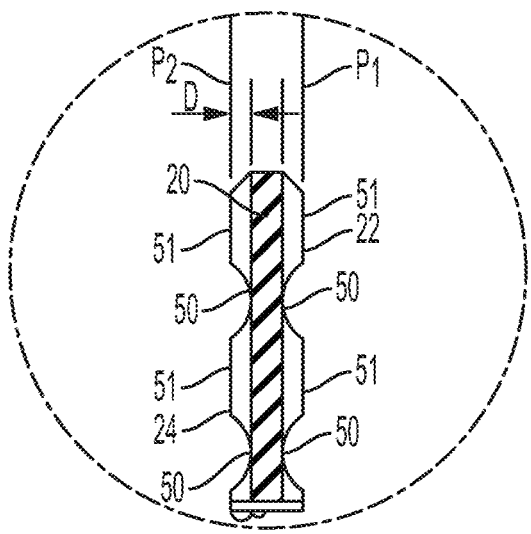
FIG. 15 is an enlarged detail of a portion of the cross-sectional view taken from FIG. 13 showing the arrangement of the part-cylindrical recesses.
Figure 16:
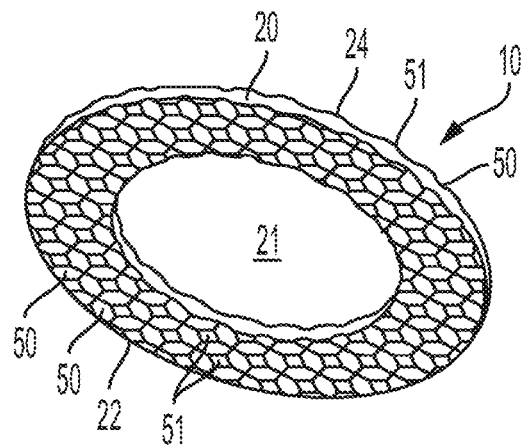
FIG. 16 is a perspective view showing the first surface of the third embodiment of the friction washer shown in FIGS. 12-15.
Figure 17:
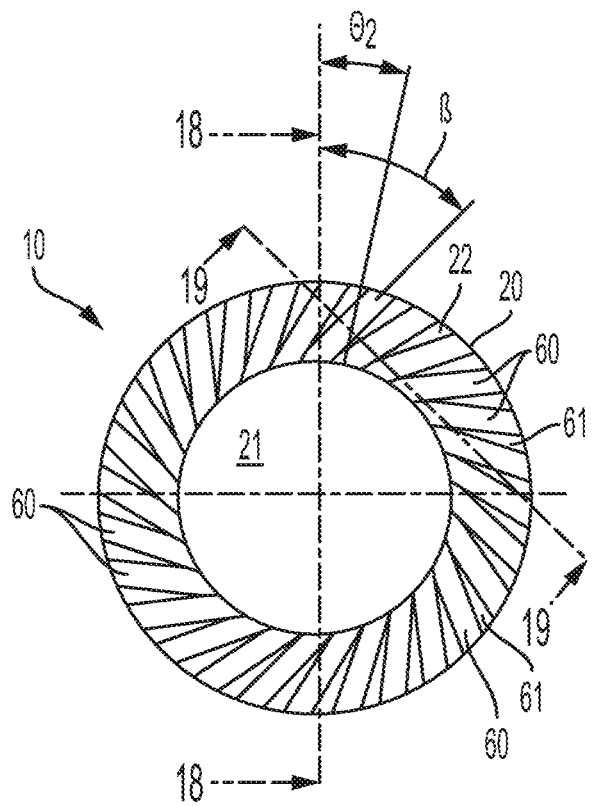
FIG. 17 is a plan view the first surface of a fourth embodiment of a friction washer in accordance with the present disclosure, with the opposing second surface being identical thereto.
Figure 18:
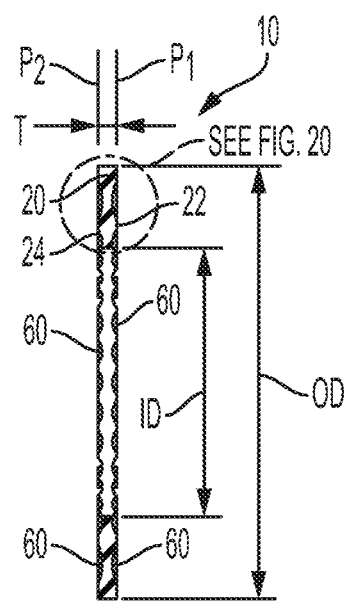
FIG. 18 is a cross-sectional view taken along line 18-28 in FIG. 17.

Referring now to FIGS. 12-16, a third embodiment of the friction washer 10 is shown in detail. The third embodiment of the friction washer 10 is the same as the first embodiment except for the arrangement of the recesses 50. In the third embodiment of the friction washer, the recesses 50 that extend into the first and second opposing surfaces 22, 24 of the disk body 20 from the respective first and second contact planes P1, P2 are part-cylindrical recesses, and at least some of the part-cylindrical recesses 50 intersect one another. As shown in FIG. 12, the disk body 20 preferably includes the opening 21 defining the inner periphery ID in the disk body 20. The disk body 20 also includes the outer periphery OD. In this case, both the ID and OD are shown as circular. However, non-circular shaped could also be used.

Here, the part-cylindrical recesses 50 intersect one another to define a regularly spaced grid of contact faces 51 that make-up the portion of the disk body 20 that extends to the first contact plane P1 on the first opposing surface 22. The part-cylindrical recesses 50 also intersect one another to define a regularly spaced grid of contact faces 51 that make-up the portion of the disk body 20 that extends to the second contact plane P2 on the second opposing surface 24 with the same arrangement as shown in FIG. 12. Here the grid is rectilinear and has a regular spacing, indicated from center-to-center of the part-cylindrical recesses 50 as x and y in FIG. 12. Here, x and y may be equal and can be, for example, between 5 and 10 mm, and more preferably between 6 and 8 mm. The contact faces 51 are arranged along standard X-Y axes. However, other arrangements could be provided, such as a radial-circumferential grid arrangement. As shown, the contact faces 51 are square. However, they could have other shapes. Further, the arrangement of the contact faces 51 as well as their size may be different on each of the opposing sides 22, 24, or one of the opposing sides 22, 24 could be smooth.

This arrangement with the part-cylindrical recesses 50 arranged in a rectilinear grid provides flow paths for the lubrication fluid between the friction washer 10 and the mating friction partner in the limited slip differential. Additionally, the curved shape of the part-cylindrical recesses 50 also provides for better retention of the lubricating fluid, which also provides for a generally constant coefficient of friction with changing speed and pressure.

In the illustrated embodiment, the OD of the friction washer 10 is shown as being about 70 mm and the ID is shown as being about 44 mm. The thickness T of the friction washer 10 is about 2.5 mm to 2.9 mm, but could vary depending on the particular application, and a maximum depth D of the part-cylindrical recesses 50 is 0.6 mm. In this case, the part-cylindrical recesses have a radius RB of less than 10 mm, and more preferably about 5 mm.

Preferably, in this embodiment, the portion of the disk body 20 that extends to the first contact plane P1 is from about 10% to 40% of a surface area of the first opposing surface 22, and more preferably is in the range of 20-35%. Further, the portion of the disk body 20 that extends to the second contact plane P2 is from about 10% to 40% of a surface area of the second opposing surface 24, and more preferably is in the range of 20-35%.

Referring to FIGS. 17-21, a fourth embodiment of the friction washer 10 is shown. The fourth embodiment of the friction washer 10 is the same as the first embodiment except for the arrangement of the recesses 60. The fourth embodiment of the friction washer 10 includes the body 20 which is provided with recesses 60 on the first and second opposing surfaces 22, 24 having partial cylindrical surfaces. In this case, the disk body 20 also includes the opening 21 that defines the inner periphery ID in the disk body 20. The disk body 20 also includes the outer periphery OD. As illustrated, the ID and OD are circular. However, non-circular shapes could be provided.

Here, the part-cylindrical recesses 60 on the first opposing surface 22 extend linearly from the inner periphery ID to the outer periphery OD, and the part-cylindrical recesses 60 on the second opposing surface 24 extend linearly from the inner periphery ID to the outer periphery OD. As illustrated, these linearly extending partial cylindrical recesses 60 extend at an angle β from a true radial direction from the inner periphery ID to the outer periphery OD in order to provide lubricating fluid flow paths from the ID to the OD. The angle β is preferably between 30° and 60°, and in the illustrated embodiment is 45°. This results in generally triangular-shaped contact faces 61 at the first contact plane P1 and at the second contact plane P2. Further, the arrangement of the contact faces 61 as well as their size may be different on each of the opposing sides 22, 24, or one of the opposing sides 22, 24 could be smooth.

As illustrated, there are preferably 28 of the part-cylindrical recesses 60, which are equally spaced apart, with θ2 approximately equal to 12.857°. However, the number of the part-cylindrical recesses 60 could vary.

In the fourth embodiment of the friction washer 10, the OD is approximately 70 mm and the ID is approximately 44 mm. The disk body 20 has a thickness T of approximately 2.5 mm to 2.9 mm, but this can vary depending on the particular application, and the partial-cylindrical recesses 60 have a maximum depth D of about 0.5 mm. In this case, the radius RB of the part-cylindrical recesses is preferably less than 5 mm, and more preferably about 4 mm.

Preferably, in this embodiment, the portion of the disk body 20 that extends to the first contact plane P1 is from about 10% to 40% of a surface area of the first opposing surface 22, and more preferably is in the range of 20-35%. Further, the portion of the disk body 20 that extends to the second contact plane P2 is from about 10% to 40% of a surface area of the second opposing surface 24, and more preferably is in the range of 20-35%.

The fourth embodiment of the friction washer 10 also has a generally constant coefficient of friction with changing speed and pressure based on hydrodynamic pressure created by lubricating fluid in the recesses 60 between the first and/or second opposing surface 22, 24 and the facing friction partner within the limited slip differential. The arrangement of the partial-cylindrical recesses 60 creates a boundary layer for the lubricating fluid between the rotating components to push them apart and provide the desired friction characteristics that are generally constant within the design operating conditions.

Each of the embodiments of the friction washer 10 are easily manufacturable in a mass-produced manner based on the arrangements as shown.

In order to further improve the friction characteristics, it is also possible for the first opposing surface 22 to be nitrocarburized in order to improve hardness and/or to include other surface coatings or treatments.

In testing, Applicant has found that generally uniform coefficient of friction between 0.10 and 0.15 can be achieved with these designs over most operating conditions. Applying a nitrocarburized surface treatment further improves the uniformity of the coefficient of friction over almost all operating conditions to approximately 0.09 to 0.12 for the typical conditions in limited slip differentials used in motor vehicles.

In another aspect, a method of a method of forming a friction washer 10 for a limited slip differential is provided, with the method including the steps of a) providing a disk body 20 having first and second opposing surfaces 22, 24; and b) forming recesses 30, 40, 50, 60, for example by machining, stamping or embossing, into respective first and second contact planes P1, P2 of the first and second opposing surface 22, 24 such that only a portion of the disk body 20 extends to the respective first or second contact plane P1, P2. The recesses 30, 40, 50, 60 are defined by partial spherical or partial cylindrical surfaces that can be machined using a ball end mill B, shown in FIG. 4. In a preferred embodiment, the partial spherical or partial cylindrical recesses 30, 40, 50, 60 have a radius of 2.5 mm to 5 mm and a maximum depth D of 1.2 mm or less, and more particularly less than 0.9 mm.

The method may further include forming the recesses 30 as a plurality of non-intersecting part-spherical dimples that each define a circle at a respective intersection with the first or second contact plane P1, P2. Alternatively, the method may further include forming the recesses 40 as a plurality of part-spherical recesses 40, with at least some of the part-spherical recesses 40 intersecting one another. The method can also include forming the recesses 50, 60 as a plurality of part-cylindrical recesses.

The method may further include applying a nitrocarburized surface treatment and/or other surface treatments or coatings.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein. It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS 10 friction washer
20 disk body
22 first opposing surface
24 second opposing surface
30 recesses
40 recesses
41a, 41b, 41c, etc. groups of recesses
42a, 42b, 42c, etc. caterpillar-shaped recess pathways
44a, 44b spaced apart locations
50 recesses
51 contact faces
60 recesses
61 generally triangular-shaped contact faces
D depth
ID inside diameter
OD outside diameter
P1 first contact plane
P2 second contact plane
R1-R6 radii
RB radius of recess
T thickness
α1-α5 angles
β angle from true radial
θ1 angle
θ2 angle

The invention claimed is:

1. A friction washer for a limited slip differential, the friction washer comprising:
    a disk body having first and second opposing surfaces;
    the first opposing surface defining a first contact plane and including recesses that extend into the disk body from the first contact plane such that only a portion of the disk body extends to the first contact plane;
    the second opposing surface defining a second contact plane and including recesses that extend into the disk body from the second contact plane such that only a portion of the disk body extends to the second contact plane; and
    the recesses that extend into the disk body from the first contact plane and from the second contact plane are defined by partial spherical;
    wherein the recesses that extend into the disk body from the first contact plane and from the second contact plane are defined as a plurality of part-spherical recesses, and at least some of the part-spherical recesses on the first opposing surface intersect one another and at least some of the part-spherical recesses on the second opposing surface intersect one another; and
    wherein the disk body includes an opening defining an inner periphery in the disk body, and the disk body further includes an outer periphery, and the part-spherical recesses that intersect one another on the first opposing surface are arranged as a plurality of groups, each of the groups includes a sub-set of the part-spherical recesses that intersect at least one of the other ones of the part-spherical recesses in the group to form a recess pathway on the first opposing surface that extends from the inner periphery to the outer periphery in which each of the part-spherical recesses in the group, other than any part-spherical recesses that intersect the inner periphery and the outer periphery, intersects the first contact plane at two spaced apart locations.

2. The friction washer of claim 1, wherein the portion of the disk body extends to the first contact plane is from about 10% to 40% of a surface area of the first opposing surface, and the disk body extends to the second contact plane is from about 10% to 40% of a surface area of the second opposing surface.

3. The friction washer of claim 1, wherein the part-spherical recesses that intersect one another on the second opposing surface are arranged as a plurality of groups, each of the groups includes a sub-set of the part-spherical recesses that intersect at least one of the other ones of the part-spherical recesses in the group to form a recess pathway on the second opposing surface that extends from the inner periphery to the outer periphery in which each of the part-spherical recesses in the group, other than the part-spherical recesses that intersect the inner periphery and the outer periphery, intersects the second contact plane at two spaced apart locations.

4. The friction washer of claim 3, wherein the part-spherical recesses in each of the groups, other than the part-spherical recesses that intersect the inner periphery, do not intersect the part-spherical recesses of other ones of the subsets.

5. The friction washer of claim 3, wherein the recess pathways on the first opposing surface and on the second opposing surface each provide a lubricating fluid path from the inner periphery to the outer periphery that include internal ridges between the intersecting part-spherical recesses in each said group.

6. The friction washer of claim 3, wherein the recess pathways each extend at an angle offset from a true radial direction.

7. The friction washer of claim 6, wherein each of the part-spherical recesses in one of the subsets is offset in a circumferential direction from an adjacent intersecting radially inwardly located one of the part-spherical recesses in the one of the subsets.

8. The friction washer of claim 1, wherein the recesses have a maximum depth of 0.9 mm.

9. A method of forming a friction washer for a limited slip differential, the method comprising:
    providing a disk body having first and second opposing surfaces; and
    forming recesses into respective first and second contact planes of the first and second opposing surfaces such that only a portion of the disk body extends to the respective first or second contact plane, wherein the recesses are defined by partial spherical surfaces, wherein the recesses that extend into the disk body from the first contact plane and from the second contact plane are defined as a plurality of part-spherical recesses, and at least some of the part-spherical recesses on the first opposing surface intersect one another and at least some of the part-spherical recesses on the second opposing surface intersect one another, wherein the disk body includes an opening defining an inner periphery in the disk body, and the disk body further includes an outer periphery, and the part-spherical recesses that intersect one another on the first opposing surface are arranged as a plurality of groups, each of the groups includes a sub-set of the part-spherical recesses that intersect at least one of the other ones of the part-spherical recesses in the group to form a recess pathway on the first opposing surface that extends from the inner periphery to the outer periphery in which each of the part-spherical recesses in the group, other than any part-spherical recesses that intersect the inner periphery and the outer periphery, intersects the first contact plane at two spaced apart locations.

\* \* \* \* \*